United States Patent
Wu et al.

(10) Patent No.: US 12,159,426 B2
(45) Date of Patent: Dec. 3, 2024

(54) METHOD FOR TROUBLESHOOTING HIDDEN DANGERS OF TREES NEAR POWER TRANSMISSION LINES BY COMBINING ICESAT-2 WITH JL-1 IMAGES

(71) Applicant: Wuhan University, Wuhan (CN)

(72) Inventors: Zhaocong Wu, Wuhan (CN); Haoyu Lin, Wuhan (CN); Zhao Yan, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 360 days.

(21) Appl. No.: 17/882,591

(22) Filed: Aug. 7, 2022

(65) Prior Publication Data
US 2023/0186503 A1 Jun. 15, 2023

(30) Foreign Application Priority Data
Dec. 14, 2021 (CN) .......................... 202111524259.2

(51) Int. Cl.
*G06T 7/60* (2017.01)
*G06V 20/10* (2022.01)
*G01S 17/894* (2020.01)

(52) U.S. Cl.
CPC .............. *G06T 7/60* (2013.01); *G06V 20/188* (2022.01); *G01S 17/894* (2020.01); *G06T 2207/10032* (2013.01); *G06T 2207/30188* (2013.01)

(58) Field of Classification Search
CPC ............. G06T 7/60; G06T 2207/10032; G06T 2207/30188; G06V 20/188; G06V 10/774; G06V 20/13; G01S 17/894; G01S 17/89
See application file for complete search history.

(56) References Cited

U.S. PATENT DOCUMENTS

| | | | |
|---|---|---|---|
| 2009/0265193 A1* | 10/2009 | Collins | G06Q 30/0185 901/46 |
| 2017/0115256 A1* | 4/2017 | Chantz | G01N 29/46 |
| 2017/0285091 A1* | 10/2017 | Jiang | H02J 3/381 |
| 2019/0235011 A1* | 8/2019 | Pinney | G01B 11/0616 |
| 2020/0250424 A1* | 8/2020 | Klein | G06T 7/13 |

(Continued)

FOREIGN PATENT DOCUMENTS

| | | | | |
|---|---|---|---|---|
| CN | 112736761 A | * | 4/2021 | |
| WO | WO-2022100353 A1 | * | 5/2022 | G06K 9/00651 |

*Primary Examiner* — Solomon G Bezuayehu
(74) *Attorney, Agent, or Firm* — MATTHIAS SCHOLL P.C.; Matthias Scholl

(57) ABSTRACT

A method for retrieving heights of densely-covered forest canopies near power transmission lines includes: acquiring ICESat-2 LiDAR data, JL-1 image data, auxiliary data and three-dimensional information data about the power transmission lines within a target area; carrying out image preprocessing on a JL-1 image to generate a first image; screening the ICESat-2 LiDAR data according to a screening rule to obtain high-quality laser tree height data; by employing the first image, the high-quality laser tree height data and the auxiliary data, training a neural network model for retrieving a forest tree height according to an optical image and the auxiliary data; by employing the neural network model, generating a height distribution map of densely-covered trees in the target area; and calculating a height difference between a tree and a power transmission line nearest the tree to generate a hidden danger troubleshooting theme map.

9 Claims, 3 Drawing Sheets

(56) References Cited

U.S. PATENT DOCUMENTS

| | | | |
|---|---|---|---|
| 2021/0073692 A1* | 3/2021 | Saha | G08B 21/16 |
| 2021/0142559 A1* | 5/2021 | Yousefhussien | G06Q 10/06315 |
| 2021/0318121 A1* | 10/2021 | Laroche | G01C 11/025 |
| 2022/0253057 A1* | 8/2022 | Tian | G01S 17/88 |
| 2023/0274197 A1* | 8/2023 | Zhao | G16Y 40/20 382/100 |

* cited by examiner

METHOD FOR TROUBLESHOOTING HIDDEN DANGERS OF TREES NEAR POWER TRANSMISSION LINES BY COMBINING ICESAT-2 WITH JL-1 IMAGES

CROSS-REFERENCE TO RELATED APPLICATIONS

Pursuant to 35 U.S.C. § 119 and the Paris Convention Treaty, this application claims foreign priority to Chinese Patent Application No. 202111524259.2 filed Dec. 14, 2021, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of quantitative remote sensing, and more particularly to a method for retrieving a tree height and troubleshooting a hidden danger near a power transmission line by combining ice, cloud, and land elevation satellite-2 (ICESat-2) LiDAR data with JiLin-1 (JL-1) high-resolution multi-spectral remote sensing images.

Tall trees are a major hidden danger threatening the safety of power transmission lines, so it is very necessary to study and map a forest canopy height near a power transmission line. However, how to obtain regional, high-precision and densely-covered forest canopy height distribution is still a big problem and challenge.

A traditional method of obtaining a tree canopy height is on-field measurement. This method may obtain high-precision tree height data, but the scope of the data is limited, and the method is time-consuming, labor-consuming and money-consuming. A remote sensing technology has the characteristics of large-area synchronous observation, long-time continuous observation and rich information, and the like, and may be well applied in forest parameter acquisition.

Optical remote sensing data may provide abundant forest information of horizontal direction, such as vegetation index and vegetation coverage, etc., and also has been applied in forestry research earlier. However, the optical remote sensing data is poor in penetrability, and the energy of electromagnetic waves, after penetrating canopies, is greatly weakened, so there is a great deficiency in obtaining vertical structure parameters of a forest, and moreover, in areas with a high vegetation coverage, acquired information is relatively easy to saturate. LiDAR (Light Detection and Ranging) is a novel active remote sensing technology with the characteristics of high accuracy, high resolution, low weather influence and good penetrability, and the like, and can penetrate canopies to obtain vertical structure information of trees. However, LiDAR is a series of discontinuous discrete points, which cannot obtain regional and densely-covered tree height data.

SUMMARY

Directed at problems existing in the prior art, the disclosure proposes a method for retrieving heights of densely-covered forest canopies near power transmission lines through the combined utilization of LiDAR data, optical remote sensing images, and various auxiliary data including terrain and climate data and the like, and achieves an effect of automatically troubleshooting hidden dangers near power transmission facilities according to tree height retrieval results. The method mainly includes the following steps:

at step 1: acquiring ICESat-2 LiDAR data, JL-1 image data, auxiliary data and three-dimensional information data about the power transmission lines within a target area;

at step 2: carrying out image preprocessing on a JL-1 image according to a preprocessing method to generate a first image;

at step 3: screening the ICESat-2 LiDAR data according to a screening rule to obtain high-quality laser tree height data;

at step 4: by employing the first image, the high-quality laser tree height data and the auxiliary data, training a neural network model for retrieving a forest tree height according to an optical image and the auxiliary data;

at step 5: by employing the neural network model, generating a height distribution map of densely-covered trees in the target area; and at step 6: according to the height distribution map of densely-covered trees and the three-dimensional information about the power transmission lines, calculating a height difference between a tree and a power transmission line nearest the tree to generate a hidden danger troubleshooting theme map.

In a class of this embodiment, step 1 is concretely implemented as follows: acquiring a latitude and longitude range of the target area;

acquiring a JL-1 image covering the target area and an imaging time;

acquiring the ICESat-2 LiDAR data within the latitude and longitude range of the target area wherein the acquisition time of the JL-1 image and the imaging time do not exceed specified thresholds;

acquiring the auxiliary data within the latitude and longitude range of the target area, comprising DEM, slope, aspect, humidity, precipitation and accumulated temperature; and acquiring three-dimensional information about the power transmission lines in the latitude and longitude range of the target area, comprising the longitudes, latitudes and heights of the power transmission lines.

In a class of this embodiment, step 2 is concretely implemented as follows:

carrying out radiometric calibration and geometric correction on the JL-1 image;

if there are a plurality of images, carrying out relative radiometric correction on the plurality of JL-1 images; and carrying out scale standardization and image splicing on the JL-1 image with a standard of an ICESat-2 data scale so as to obtain the first image.

In a class of this embodiment, the radiometric calibration is implemented by: performing radiometric calibration on the JL-1 image in the following formula to generate a radiance image:

$$L = \text{gain} \times DN + \text{bias}$$

where, L refers to a radiance; gain and bias respectively refer to a gain and a bias of a JL-1 sensor, which may be obtained from a JL-1 image file; and DN refers to an image pixel value; and the geometric correction is implemented by: collecting a JL-1 image to be corrected and a digital elevation model image capable of covering an entire area of the image to be corrected, where the JL-1 image contains rational polynomial coefficient parameters describing imaging geometry, and a coordinate system of the digital elevation model image is a WGS84 coordinate system; then, according to a rational function imaging model, as shown in the following formula, calculating a corresponding relationship between pixels of an orthophoto image and pixels of the JL-1 image to be corrected; and finally, generating a geometrically-corrected JL-1 orthophoto image through pixel resampling;

$$X = \frac{Num_1(P, L, H)}{Den_1(P, L, H)}, Y = \frac{Num_2(P, L, H)}{Den_2(P, L, H)}$$

where, $Num_1(P,L,H)=a_1+a_2L+a_3P+a_4H+a_5LP+a_6LH+a_7PH+a_8L^2+a_9P^2+a_{10}H^2+a_{11}PLH+a_{12}L^3+a_{13}LP^2+a_{14}LH^2+a_{15}L^2P+a_{16}P^3+a_{17}PH^2+a_{18}L^2H+a_{19}P^2H+a_{20}H^3$, $Den_1(P,L,H)=b_1+b_2L+b_3P+b_4H+b_5LP+b_6LH+b_7PH+b_8L^2+b_9P^2+b_{10}H^2+b_{11}PLH+b_{12}L^3+b_{13}LP^2+b_{14}LH^2+b_{15}L^2P+b_{16}P^3+b_{17}PH^2+b_{18}L^2H+b_{19}P^2H+b_{20}H^3$, $Num_2(P,L,H)=c_1+c_2L+c_3P+c_4H+c_5LP+c_6LH+c_7PH+c_8L^2+c_9P^2+c_{10}H^2+c_{11}PLH+c_{12}L^3+c_{13}LP^2+c_{14}LH^2+c_{15}L^2P+c_{16}P^3+c_{17}PH^2+c_{18}L^2H+c_{19}P^2H+c_{20}H^3$, $Den_2(P,L,H)=d_1+d_2L+d_3P+d_4H+d_5LP+d_6LH+d_7PH+d_8L^2+d_9P^2+d_{10}H^2+d_{11}PLH+d_{12}L^3+d_{13}LP^2+d_{14}LH^2+d_{15}L^2P+d_{16}P^3+d_{17}PH^2+d_{18}L^2H+d_{19}P^2H+d_{20}H^3$, (X, Y) refers to a coordinate of a regularized image point, (P, L, H) refers to a coordinate of a regularized ground point, $a_i$, $b_i$, $c_i$ and $d_i$ refer to the coefficients of rational polynomials, and i is in a range of 1 to 20.

In a class of this embodiment, carrying out relative radiometric correction on the plurality of JL-1 images is implemented by: counting a gray histogram of each waveband of each image; and with one of the images as a reference image, carrying out histogram matching on each waveband of the other images based on a corresponding waveband of the reference image to achieve the relative radiometric correction among the images, thereby eliminating a radiance difference caused by a same sensor due to its own reasons.

In a class of this embodiment, carrying out scale standardization and image splicing on the JL-1 image to obtain a first image is implemented by: calculating an average value of pixels in each 5×5 region of each pixel of the JL-1 image as a DN value of a new pixel, so as to achieve the scale unification between two types of data; and finally, carrying out image splicing to obtain the first image, and calculating a normalized differential vegetation index (NDVI) value, where the DN value is an image pixel value.

In a class of this embodiment, the step of screening the ICESat-2 LiDAR data according to a screening rule is implemented by: firstly, setting a fine screening condition based on a quality control parameter as follows:
the number of photons is greater than 140;
the percentage of canopy photons is greater than 5%;
a night identifier is night;
a city identifier is not city;
a land cover type is tree;
a geographical location accuracy is less than 6.5 m; and
a canopy height error is less than 7 m;
and then, loading laser tree height data subjected to the first screening onto the first image, checking shade and bare soil areas in the image and culling abnormal points, so as to obtain the high-quality laser tree height data.

In a class of this embodiment, step 4 is implemented by: calculating a ratio vegetation index RVI, an enhanced vegetation index EVI and a soil adjusted vegetation index SAVI on the first image, extracting reflectance parameters of wavebands and auxiliary data comprising elevation, slope, aspect, humidity, accumulated temperature and precipitation, calculating correlations of the vegetation indexes, the reflectance parameters of wavebands, the auxiliary data and the tree height, and selecting retrieval parameters according to the size of the correlations; and randomly dividing tree height samples into two parts, i.e., 80% and 20%, where 80% is used as training data and 20% is used as verification data; carrying out training, parameter optimization and verification on the neural network model by taking the selected parameters and tree heights as input and output parameters of the neural network model.

In a class of this embodiment, step 5 is implemented by: inputting the vegetation indexes, reflectance parameters of wavebands and auxiliary data of an area on which no laser point is covered in the target area into the neural network model, and outputting tree heights of the area on which no laser point is covered in the target area, so as to generate a height distribution map of densely-covered trees in the target area.

In a class of this embodiment, step 6 is implemented by: importing the three-dimensional information about the power transmission lines into the height distribution map of densely-covered trees in the target area; establishing a power transmission line buffer area; calculating a height difference between a tree in the power transmission line buffer area and a power transmission line nearest the tree, where the height difference is equal to the height of the tree minus the height of the power transmission line, positive values are denoted in red, negative values of which the absolute values are less than 3 m are denoted in yellow, and negative values of which the absolute values are greater than 3 m are denoted in blue; drawing the hidden danger troubleshooting theme map, and carrying focused inspection for red and yellow areas in the distribution map to realize hidden dangers troubleshooting.

Compared with the prior art, the disclosure has the following advantages and beneficial effects:
1. A screening rule of ICesAT-2 laser point data is provided to culling laser point data with a quality problem, thereby improving the precision of extracted ICESat-2 LiDAR tree height data;
2. A processing method of a high resolution optical remote sensing image is provided to realize scale unification between an optical image and LiDAR data, thereby reducing errors caused by scale differences;
3. The advantage of dense coverage of optical remote sensing data and the advantage of LiDAR high-precision vertical information are comprehensively utilized, thereby improving the accuracy of estimating a regional densely-covered forest canopy height; and
4. By combining a densely-covered forest canopy height of a target area generated by a retrieval model with the three-dimensional information about power transmission lines, an effect of troubleshooting hidden dangers of trees near power transmission lines is achieved more quickly and efficiently than traditional field investigation and UAV (unmanned aerial vehicle) monitoring.

DETAILED DESCRIPTION OF THE EMBODIMENTS

Figure 1:
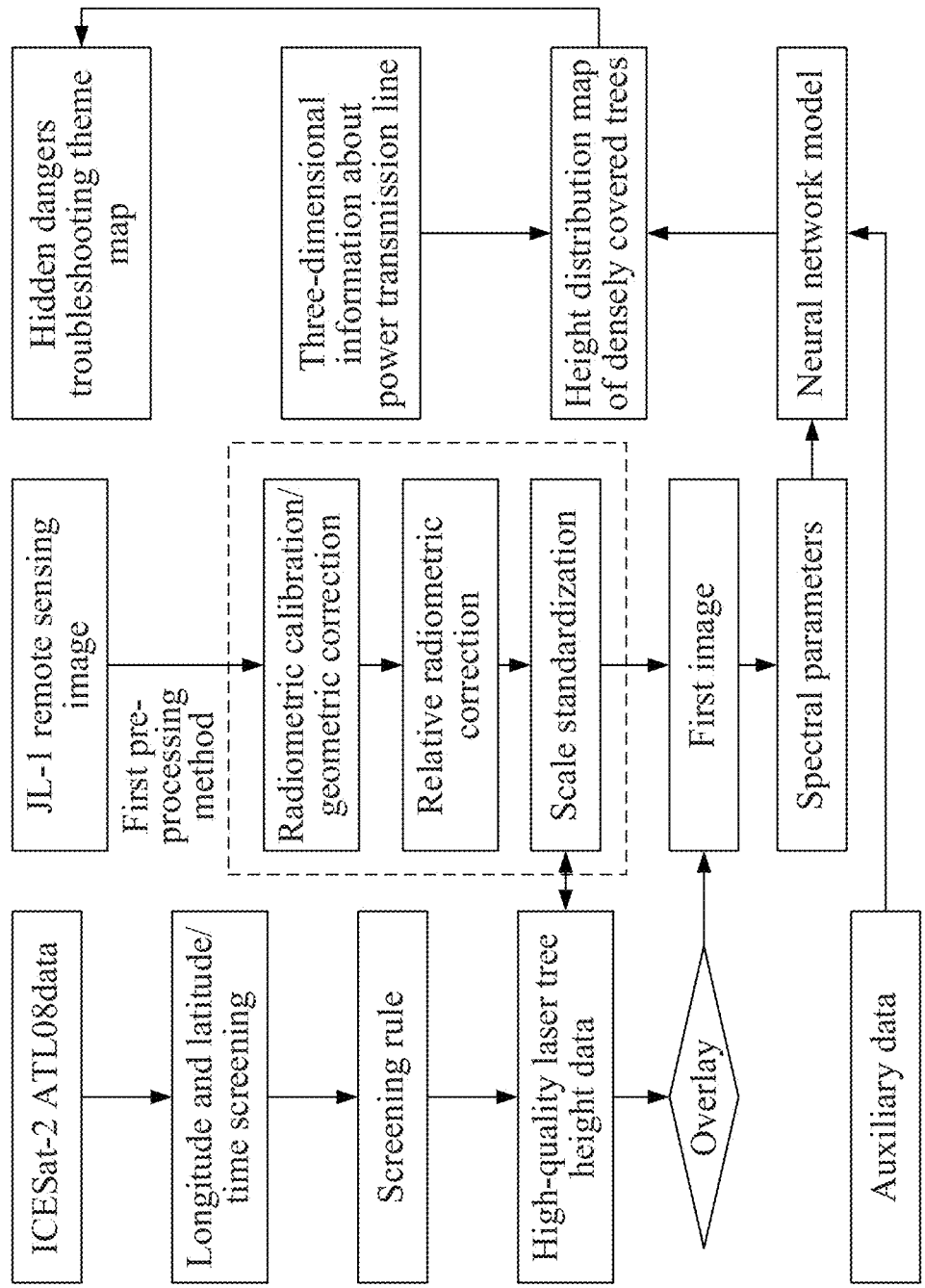
FIG. 1 shows an overall flow chart of a method for troubleshooting hidden dangers of trees near power transmission lines by combining ICESaT-2 with JL-1 images.

As shown in FIG. 1, the disclosure provides a method for troubleshooting hidden dangers of trees near power transmission lines by combining ICESaT-2 with JL-1 images, which includes the following steps:

step (1): acquiring ICESat-2 LiDAR data, JL-1 image data, auxiliary data and three-dimensional information data about power transmission lines within a target area;

step (2): carrying out image preprocessing on a JL-1 image according to a first preprocessing method to generate a first image;

step (3): screening the ICESat-2 LiDAR data according to a screening rule to obtain high-quality laser tree height data;

step (4): employing the first image, the high-quality laser tree height data and the auxiliary data to train a neural network model for retrieving a forest tree height according to an optical image and the auxiliary data;

step (5): employing the neural network model to generate a height distribution map of densely-covered trees in the target area; and step (6): according to the height distribution map of densely-covered trees and the three-dimensional information about power transmission lines, calculating a height difference between a tree and a power transmission line nearest the tree to generate a hidden danger troubleshooting theme map.

The following describes the disclosure in detail with reference to specific embodiments, and the specific implementation steps are described below.

(1) The latitude and longitude range of the target area is determined, a JL-1 image fully covering the target area is selected according to the latitude and longitude range of the target area, and an imaging time of the JL-1 image is obtained; the ICESat-2 LiDAR data is screened according to the latitude and longitude range of the target area, and the data acquisition time and the imaging time of the JL-1 image not exceeding 3 months; auxiliary data including DEM, slope, aspect, humidity, accumulated temperature, etc. within the latitude and longitude range of the target area is acquired; and the three-dimensional information about power transmission lines in the target area is collected, including the longitudes, latitudes and heights of the transmission lines.

An ATLAS (Advanced Topographic Laser Altimeter System), i.e., a small-spot LiDAR device, with a resolution of 17 m, is carried in the ICESat-2 satellite launched by NASA (National Aeronautics and Space Administration) in September 2018, which may be combined with the JL-1 high-resolution optical remote sensing data to realize the forest height retrieval and hidden danger troubleshooting near power transmission lines.

(2) Firstly, JL-1 image data is subjected to preprocessing including radiometric calibration, geometric correction, relative radiometric correction, scale standardization calculation and image splicing.

The radiometric calibration is implemented by employing a calibration formula (as shown below) to perform radiometric calibration on the JL-1 image to generate a radiance image;

$L = \text{gain} \times DN + \text{bias}$ where, L refers to a radiance; gain and bias respectively refer to a gain and a bias of a JL-1 sensor, which may be obtained from a JL-1 image file; and DN refers to an image pixel value.

The geometric correction is implemented by: collecting a JL-1 image to be corrected and a digital elevation model image capable of covering the entire area of the image to be corrected, where the JL-1 image needs to contain a rational polynomial coefficient (RPC) parameter describing the imaging geometry, and a coordinate system of the digital elevation model image is a WGS84 coordinate system; then, according to a rational function imaging model (as shown below), calculating a corresponding relationship between pixels of an orthophoto image and pixels of the JL-1 image to be corrected; and finally, generating a geometrically-corrected JL-1 orthophoto image through pixel resampling;

$$X = \frac{Num_1(P, L, H)}{Den_1(P, L, H)}, Y = \frac{Num_2(P, L, H)}{Den_2(P, L, H)}$$

where, $Num_1(P,L,H) = a_1 + a_2 L + a_3 P + a_4 H + a_5 LP + a_6 LH + a_7 PH + a_8 L^2 + a_9 P^2 + a_{10} H^2 + a_{11} PLH + a_{12} L^3 + a_{13} LP^2 + a_{14} LH^2 + a_{15} L^2 P + a_{16} P^3 + a_{17} PH^2 + a_{18} L^2 H + a_{19} P^2 H + a_{20} H^3$, $Den_1(P,L,H) = b_1 + b_2 L + b_3 P + b_4 H + b_5 LP + b_6 LH + b_7 PH + b_8 L^2 + b_9 P^2 + b_{10} H^2 + b_{11} PLH + b_{12} L^3 + b_{13} LP^2 + b_{14} LH^2 + b_{15} L^2 P + b_{16} P^3 + b_{17} PH^2 + b_{18} L^2 H + b_{19} P^2 H + b_{20} H^3$, $Num_2(P,L,H) = c_1 + c_2 L + c_3 P + c_4 H + c_5 LP + c_6 LH + c_7 PH + c_8 L^2 + c_9 P^2 + c_{10} H^2 + c_{11} PLH + c_{12} L^3 + c_{13} LP^2 + c_{14} LH^2 + c_{15} L^2 P + c_{16} P^3 + c_{17} PH^2 + c_{18} L^2 H + c_{19} P^2 H + c_{20} H^3$, $Den_2(P,L,H) = d_1 + d_2 L + d_3 P + d_4 H + d_5 LP + d_6 LH + d_7 PH + d_8 L^2 + d_9 P^2 + d_{10} H^2 + d_{11} PLH + d_{12} L^3 + d_{13} LP^2 + d_{14} LH^2 + d_{15} L^2 P + d_{16} P^3 + d_{17} PH^2 + d_{18} L^2 H + d_{19} P^2 H + d_{20} H^3$, (X, Y) refers to a coordinate of a regularized image point, (P, L, H) refers to a coordinate of a regularized ground point, $a_i$, $b_i$, $c_i$ and $d_i$ refer to the coefficients of rational polynomials, and i is in a range of 1 to 20.

If there are a plurality of images in the target area, a gray histogram of each waveband of each image is required to be counted. With one of the images as a reference image, histogram matching is carried out on each waveband of the other images based on a corresponding waveband of the reference image to achieve relative radiometric correction among the images (if there is only one image in the study area, this step is not required).

Then, the JL-1 images and the ICESat-2 LiDAR data are subjected to scale unification calculation, which is implemented by: firstly, carrying out up-scaling calculation on the JL-1 data, then calculating an average value for pixels in the 5×5 region of each pixel of the JL-1 image as a DN value of a new pixel to generate an intermediate image with a resolution of 15 m, where the resolution of the intermediate image is approximately consistent with the 17 m spatial resolution of the ICESat-2 LiDAR data.

Finally, all the intermediate images are spliced by using an automatic image splicing method to generate the first image, and a normalized differential vegetation index (NDVI) value of each image is calculated as an inspection attribute parameter.

(3) The ICESat-2 LiDAR data is screened according to a quality control screening rule, where a quality control standard includes night observation, photon number and photon type, groundcover type and data quality, and the corresponding parameters and screening standards are as follows:

the number of photons should be greater than 140;
the percentage of canopy photons should be greater than 5%;
a night identifier should be night;
a city identifier should not be city;
the groundcover type should be trees;
a geographical location accuracy should be less than 6.5 m; and
a canopy height error should be less than 7 m.

Next, the laser tree height data subjected to first screening is loaded onto the first image, whether there are laser points in shade and bare soil areas of the image is checked, attribute parameters thereof are checked and abnormal points are culled. For example, if the NDVI value corresponding to the position of a laser point in the shade area is extremely low, but the tree height is large, the laser point needs to be culled; and after screening, checking and culling, high-quality laser tree height data is obtained.

(4) Vegetation indexes such as a ratio vegetation index RVI, an enhanced vegetation index EVI and a soil adjusted vegetation index SAVI and the like are calculated from the first image, a reflectance parameter of each waveband and auxiliary data (including elevation, slope, aspect, humidity, accumulated temperature and precipitation, and the like) are extracted, correlation coefficients of the vegetation indexes, the reflectance parameters of wavebands, the auxiliary data and the tree height are calculated, the above items are sorted based on the sizes of the correlation coefficients, and the first N items with the highest correlation are selected as input parameters of the neural network retrieval model.

Figure 2:
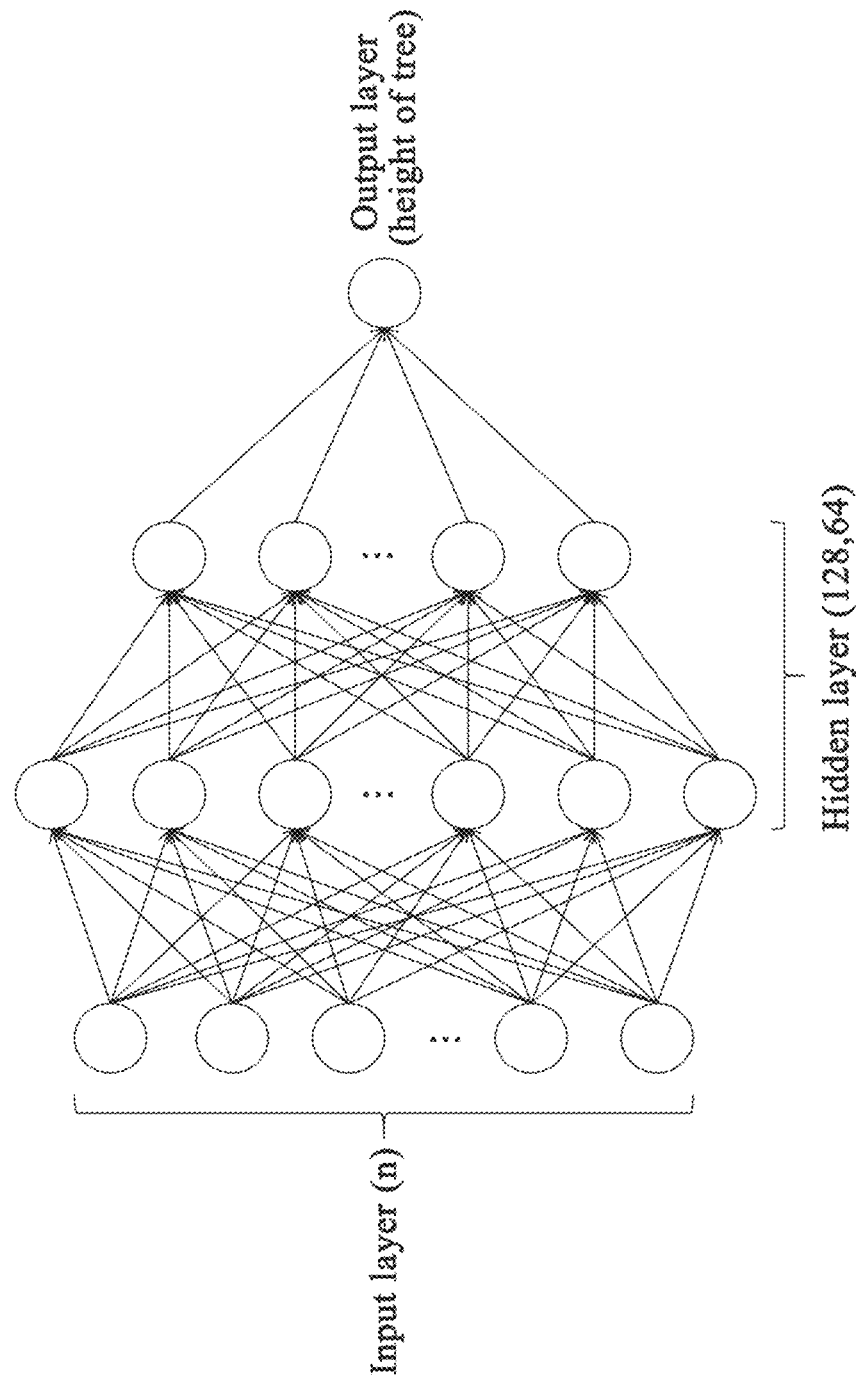
FIG. 2 shows a network structure diagram of a tree height retrieval neural network model.

(5) Tree height laser point data is randomly divided into two parts, i.e., 80% thereof as training data and 20% as verification data; the data selected in step (4) and tree heights are taken as input and output parameters of the neural network model (the structure of the neural network model is shown in FIG. 2, including an input layer, a hidden layer and an output layer) to carry out training, optimization, evaluation and validation on the network model.

(6) By use of the neural network model built in step (5), selected retrieval parameters of an area on which no laser point is covered in the target area is input into the neural network model to output tree heights of the area on which no laser point is covered in the target area, so as to generate a height distribution map of densely-covered trees in the target area.

Figure 3:
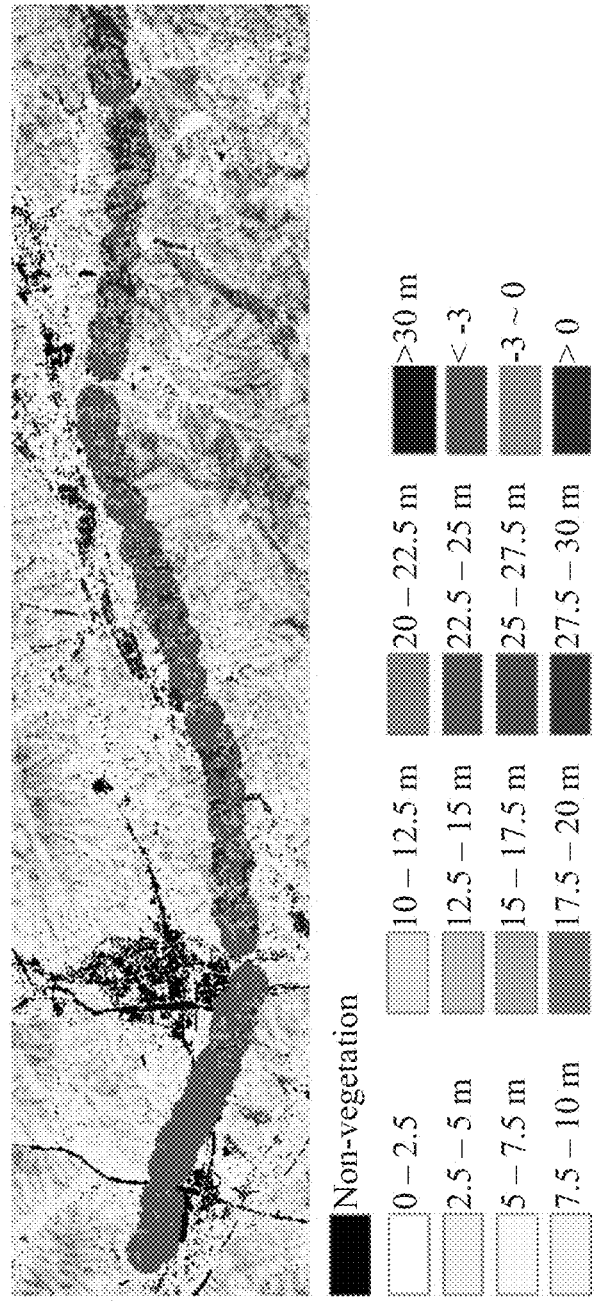
FIG. 3 shows a tree height map of a densely-covered forest in a target area and a theme map for troubleshooting hidden dangers.

(7) The three-dimensional information about power transmission lines is imported into the height distribution map of densely-covered trees in the target area generated in step (6); a 10 m buffer area is established near the power transmission lines; a height difference between a tree in the power transmission line buffer area and a power facility nearest the tree is calculated, with a result shown in FIG. 3. The height difference is equal to the height of the tree minus the height of the power transmission line, where positive values are denoted in red, negative values of which the absolute values are less than 3 m are denoted in yellow, and negative values of which the absolute values are greater than 3 m are denoted in blue; a hidden danger troubleshooting theme map is drawn, and focused inspection is carried out for the red and yellow areas in the distribution map to realize hidden dangers troubleshooting.

The specific embodiments described herein are only examples to illustrate the spirit of the disclosure. Those skilled in the art may make various amendments or supplementations to the specific embodiments described or replace them in similar ways without deviating from the spirit of the disclosure or going beyond the scope defined in the appended Claims.

What is claimed is:
1. A method for troubleshooting hidden dangers of trees near power transmission lines by combining ice, cloud, and land elevation satellite-2 (ICESat-2) with JiLin-1 (JL-1) images, the method comprising:
step 1: acquiring ICESat-2 LiDAR data, JL-1 image data, auxiliary data and three-dimensional information data about the power transmission lines within a target area;
step 2: carrying out image preprocessing on a JL-1 image according to a preprocessing method comprising radiometric correction, geometric correction, scale unification, splicing to generate a first image;
step 3: screening the ICESat-2 LiDAR data according to a screening rule to remove laser-generated tree height data with large error and obtain high-quality laser-generated tree height data;
wherein, screening the ICESat-2 LiDAR data according to the screening rule comprises: firstly, setting a fine screening condition based on a quality control parameter of ICESat-2 LiDAR data as follows:
a number of ICESat-2 LiDAR photons is greater than 140;
a percentage of canopy photons account for more than 5% of total ICESat-2 LiDAR photons;
a night identifier is night;
a city identifier is not city;
a land cover type is tree;
a geographical location accuracy is less than 6.5 m; and
a canopy height error is less than 7 m;
and then, loading the laser tree height data subjected to the screening onto the first image, checking shade and bare soil areas in the first image and culling abnormal points if the laser-generated tree height data falls in the shade and bare soil areas, the data is abnormal and needs to be eliminated, so as to obtain the high-quality laser tree height data;
step 4: by employing the first image, the high-quality laser tree height data and the auxiliary data, training a neural network model for retrieving a forest tree height according to a JL-1 image and the auxiliary data;
step 5: by employing the neural network model, generating a height distribution map of densely-covered trees in the target area; and
step 6: according to the height distribution map of densely-covered trees and the three-dimensional information about the power transmission lines, calculating a height difference between a tree and a power transmission line nearest the tree to generate a hidden danger troubleshooting theme map.

2. The method of claim 1, wherein step 1 is implemented by:
acquiring a latitude and longitude range of the target area;
acquiring a JL-1 image covering the target area and an imaging time;
acquiring the ICESat-2 LiDAR data within the latitude and longitude range of the target area, wherein the acquisition time of the JL-1 image and the imaging time do not exceed specified thresholds;
acquiring the auxiliary data within the latitude and longitude range of the target area, the auxiliary data comprising DEM, slope, aspect, humidity, precipitation and accumulated temperature; and
acquiring the three-dimensional information about the power transmission lines in the latitude and longitude range of the target area, the three-dimensional information comprising the longitudes, latitudes and heights of the power transmission lines.

3. The method of claim 1, wherein step 2 is implemented by:
carrying out radiometric calibration and geometric correction on the JL-1 image;
if there are a plurality of images, carrying out relative radiometric correction on the plurality of JL-1 images; and
carrying out scale standardization and image splicing on the JL-1 image with a standard of an ICESat-2 data scale so as to obtain the first image.

4. The method of claim 3, wherein the radiometric calibration is implemented by: performing radiometric calibration on the JL-1 image in the following formula to generate a radiance image:

$$L = \text{gain} \times DN + \text{bias}$$

where, L refers to a radiance; gain and bias respectively refer to a gain and a bias of a JL-1 sensor, which is obtained from a JL-1 image file; and DN refers to an image pixel value; and
the geometric correction is implemented by: collecting a JL-1 image to be corrected and a digital elevation model image capable of covering an entire area of the image to be corrected, where the JL-1 image contains rational polynomial coefficient parameters describing imaging geometry, and a coordinate system of the digital elevation model image is a WGS84 coordinate system; then, according to a rational function imaging model, as shown in the following formula, calculating a corresponding relationship between pixels of an orthophoto image and pixels of the JL-1 image to be corrected; and finally, generating a geometrically-corrected JL-1 orthophoto image through pixel resampling;

$$X = \frac{Num_1(P, L, H)}{Den_1(P, L, H)}, \quad Y = \frac{Num_2(P, L, H)}{Den_2(P, L, H)}$$

where, $Num_1(P,L,H) = a_1 + a_2 L + a_3 P + a_4 H + a_5 LP + a_6 LH + a_7 PH + a_8 L^2 + a_9 P^2 + a_{10} H^2 + a_{11} PLH + a_{12} L^3 + a_{13} LP^2 + a_{14} LH^2 + a_{15} L^2 P + a_{16} P^3 + a_{17} PH^2 + a_{18} L^2 H + a_{19} P^2 H + a_{20} H^3$, $Den_1(P,L,H) = b_1 + b_2 L + b_3 P + b_4 H + b_5 LP + b_6 LH + b_7 PH + b_8 L^2 + b_9 P^2 + b_{10} H^2 + b_{11} PLH + b_{12} L^3 + b_{13} LP^2 + b_{14} LH^2 + b_{15} L^2 P + b_{16} P^3 + b_{17} PH^2 + b_{18} L^2 H + b_{19} P^2 H + b_{20} H^3$, $Num_2(P,L,H) = c_1 + c_2 L + c_3 P + c_4 H + c_5 LP + c_6 LH + c_7 PH + c_8 L^2 + c_9 P^2 + c_{10} H^2 + c_{11} PLH + c_{12} L^3 + c_{13} LP^2 + c_{14} LH^2 + c_{15} L^2 P + c_{16} P^3 + c_{17} PH^2 + c_{18} L^2 H + c_{19} P^2 H + c_{20} H^3$, $Den_2(P,L,H) = d_1 + d_2 L + d_3 P + d_4 H + d_5 LP + d_6 LH + d_7 PH + d_8 L^2 + d_9 P^2 + d_{10} H^2 + d_{11} PLH + d_{12} L^3 + d_{13} LP^2 + d_{14} LH^2 + d_{15} L^2 P + d_{16} P^3 + d_{17} PH^2 + d_{18} L^2 H + d_{19} P^2 H + d_{20} H^3$, (X, Y) refers to a coordinate of a regularized image point, (P, L, H) refers to a coordinate of a regularized ground point, $a_i$, $b_i$, $c_i$ and $d_i$ refer to coefficients of rational polynomials, and i is in a range of 1 to 20.

5. The method of claim 3, wherein carrying out relative radiometric correction on the plurality of JL-1 images is implemented by: counting a gray histogram of each waveband of each image; and with one of the images as a reference image, carrying out histogram matching on each waveband of the other images based on a corresponding waveband of the reference image to achieve the relative radiometric correction among the images, thereby eliminating a radiance difference caused by a same sensor due to its own reasons.

6. The method of claim 3, wherein carrying out scale standardization and image splicing on the JL-1 image to obtain a first image is implemented by: calculating an average value of pixels in each 5×5 region of each pixel of the JL-1 image as a DN value of a new pixel, so as to achieve a scale unification between two types of data; and finally, carrying out image splicing to obtain the first image, and calculating a normalized differential vegetation index (NDVI) value, where the DN value is an image pixel value.

7. The method of claim 1, wherein step 4 is implemented by: calculating a ratio vegetation index RVI, an enhanced vegetation index EVI and a soil adjusted vegetation index SAVI on the first image, extracting reflectance parameters of wavebands and auxiliary data comprising elevation, slope, aspect, humidity, accumulated temperature and precipitation, calculating correlations of the vegetation indexes, the reflectance parameters of wavebands, the auxiliary data and the tree height, and selecting retrieval parameters according to the size of the correlations; and randomly dividing tree height samples into 80% and 20%, where 80% is used as training data and 20% is used as verification data; carrying out training, parameter optimization and verification on the neural network model by taking the selected indexes and tree heights as input and output parameters of the neural network model.

8. The method of claim 7, wherein step 5 is implemented by: inputting the vegetation indexes, reflectance parameters of wavebands and auxiliary data of an area on which no laser point is covered in the target area into the neural network model, and outputting tree heights of the area on which no laser point is covered in the target area, so as to generate a height distribution map of densely-covered trees in the target area.

9. The method of claim 1, wherein step 6 is implemented by:
importing the three-dimensional information about the power transmission lines into the height distribution map of densely-covered trees in the target area; establishing a buffer area near the power transmission line; calculating a height difference between a tree in the buffer area and a power transmission line nearest the tree, where the height difference is equal to a height of the tree minus a height of the power transmission line, positive values are denoted in red, negative values of which the absolute values are less than 3 m are denoted in yellow, and negative values of which the absolute values are greater than 3 m are denoted in blue; drawing the hidden danger troubleshooting theme map, and carrying focused inspection for red and yellow areas in the distribution map to realize hidden dangers troubleshooting.

* * * * *